(12) United States Patent
Shabani et al.

(10) Patent No.: US 12,175,331 B2
(45) Date of Patent: Dec. 24, 2024

(54) DETERMINISTIC GENERATION OF QUANTUM RESOURCE STATES

(71) Applicant: Cisco Technology, Inc., San Jose, CA (US)

(72) Inventors: Alireza Shabani, Los Angeles, CA (US); Seyed Mohammad Hassan Shapourian, San Mateo, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 97 days.

(21) Appl. No.: 17/993,092

(22) Filed: Nov. 23, 2022

(65) Prior Publication Data

US 2024/0169230 A1    May 23, 2024

(51) Int. Cl.
*G01V 3/00*  (2006.01)
*G06N 10/20*  (2022.01)
*H04B 10/70*  (2013.01)

(52) U.S. Cl.
CPC ............ *G06N 10/20* (2022.01); *H04B 10/70* (2013.01)

(58) Field of Classification Search
CPC ................................ G06N 10/20; H04B 10/70
USPC .......................................................... 324/304
See application file for complete search history.

(56) References Cited

U.S. PATENT DOCUMENTS

2021/0365827 A1    11/2021   Monroe et al.

FOREIGN PATENT DOCUMENTS

CN    108683461 A  * 10/2018  ....... H04B 10/07953
WO    2021138746 A1    7/2021

OTHER PUBLICATIONS

Antonio Russo, et al., "Photonic graph state generation from quantum dots and color centers for quantum communications," arXiv:1801.02754v3, Aug. 17, 2018, 13 pages.
Vinicius S. Ferreira, et al., "Deterministic Generation of Multidimensional Photonic Cluster States with a Single Quantum Emitter," Quantum Physics, arXiv:2206.10076v1, Jun. 21, 2022, 31 pages.

(Continued)

*Primary Examiner* — Walter L Lindsay, Jr.
*Assistant Examiner* — Frederick Wenderoth
(74) *Attorney, Agent, or Firm* — Edell, Shapiro & Finnan, LLC

(57) ABSTRACT

A method is provided for deterministically generating a photonic resource state for computational quantum computing. The method includes producing a sequence of emitted photonic qubits. The sequence of emitted photonic qubits is directed to an optical circulator of a passive entanglement component. The passive entanglement component includes the optical circulator, a delay line, and a Controlled-Z (CZ) gate. Each photon in the sequence of emitted photonic qubits is reflected at the end of the first delay line to generate a sequence of reflected photonic qubits after a predetermined time delay. The CZ gate entangles the sequence of emitted photonic qubits with the sequence of reflected photonic qubits. The optical circulator directs a resource state generated from the sequence of reflected photonic qubits entangled with the sequence of emitted photonic qubits to an output of the passive component. The resource state is emitted as a sequence of entangled photonic qubits.

20 Claims, 14 Drawing Sheets

(56) References Cited

OTHER PUBLICATIONS

Johannes Borregaard, et al., "One-way quantum repeater based on near-deterministic photon-emitter interfaces," Quantum Physics, arXiv:1907.05101v4, Jul. 9, 2020, 19 pages.

Hassan Shapourian, et al., "Modular architectures to deterministically generate graph states," Quantum Physics, arXiv:submit/4348683, Jun. 22, 2022, 19 pages.

* cited by examiner

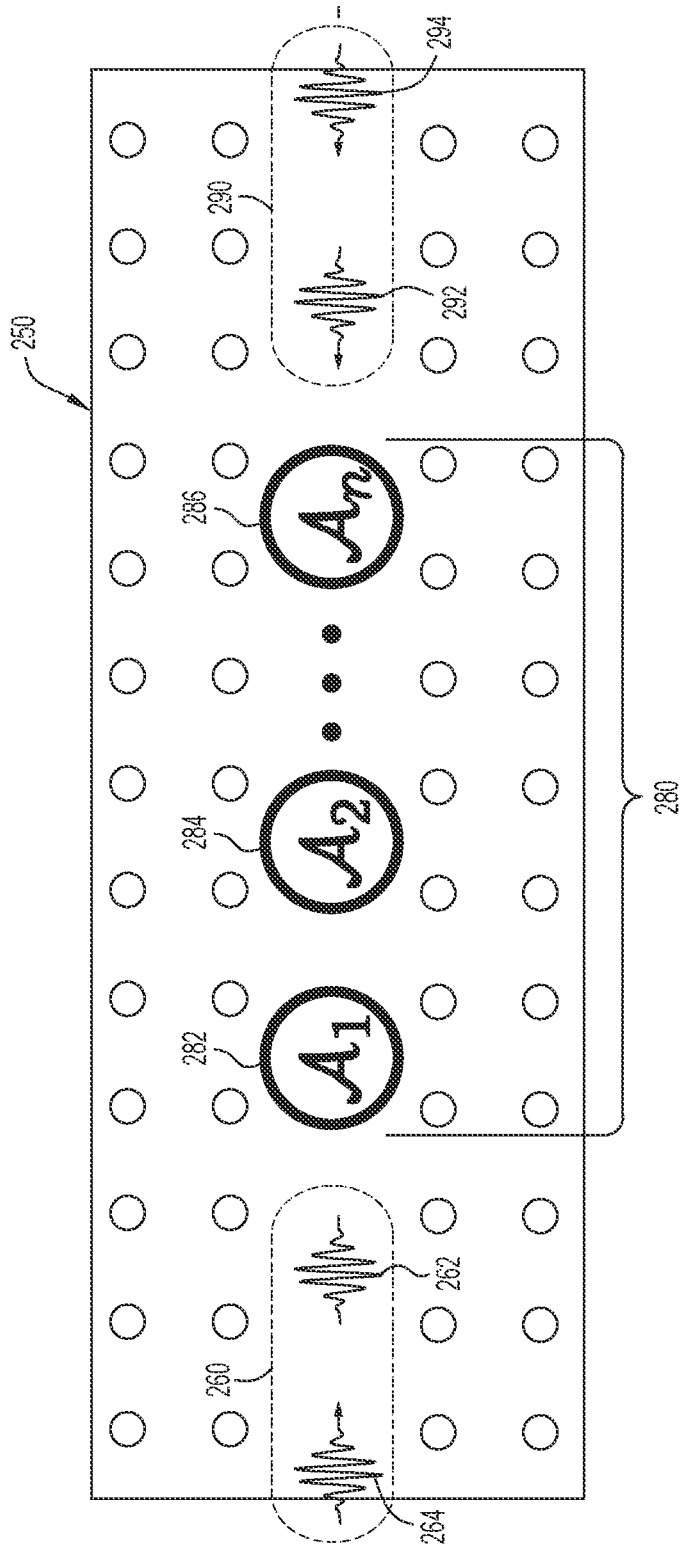

DETERMINISTIC GENERATION OF QUANTUM RESOURCE STATES

TECHNICAL FIELD

The present disclosure relates to quantum computing and quantum network communication, specifically measurement-based quantum computing.

BACKGROUND

Photonic systems present a promising route for scalable quantum information processing, such as quantum computing and networking. Integrated photonic chips have a small footprint and are networkable through optical connections to realize distributed quantum computing. Additionally, photonic qubits are typically largely insulated from environmental interactions, which acts to prevent decoherence of the photonic qubits. The relative non-interactivity of photonic qubits in comparison to matter qubits presents challenges with mediating two-photon interactions to generate entangled states. Furthermore, measuring photonic qubits generally requires a detector absorbing the photon, which completely removes the qubit after each round of measurement.

BRIEF DESCRIPTION OF THE DRAWINGS

FIG. 2C illustrates an array of quantum dots that entangle photonic qubits as a controlled-Z gate, according to an example embodiment.

DETAILED DESCRIPTION

Overview

Figure 1A:
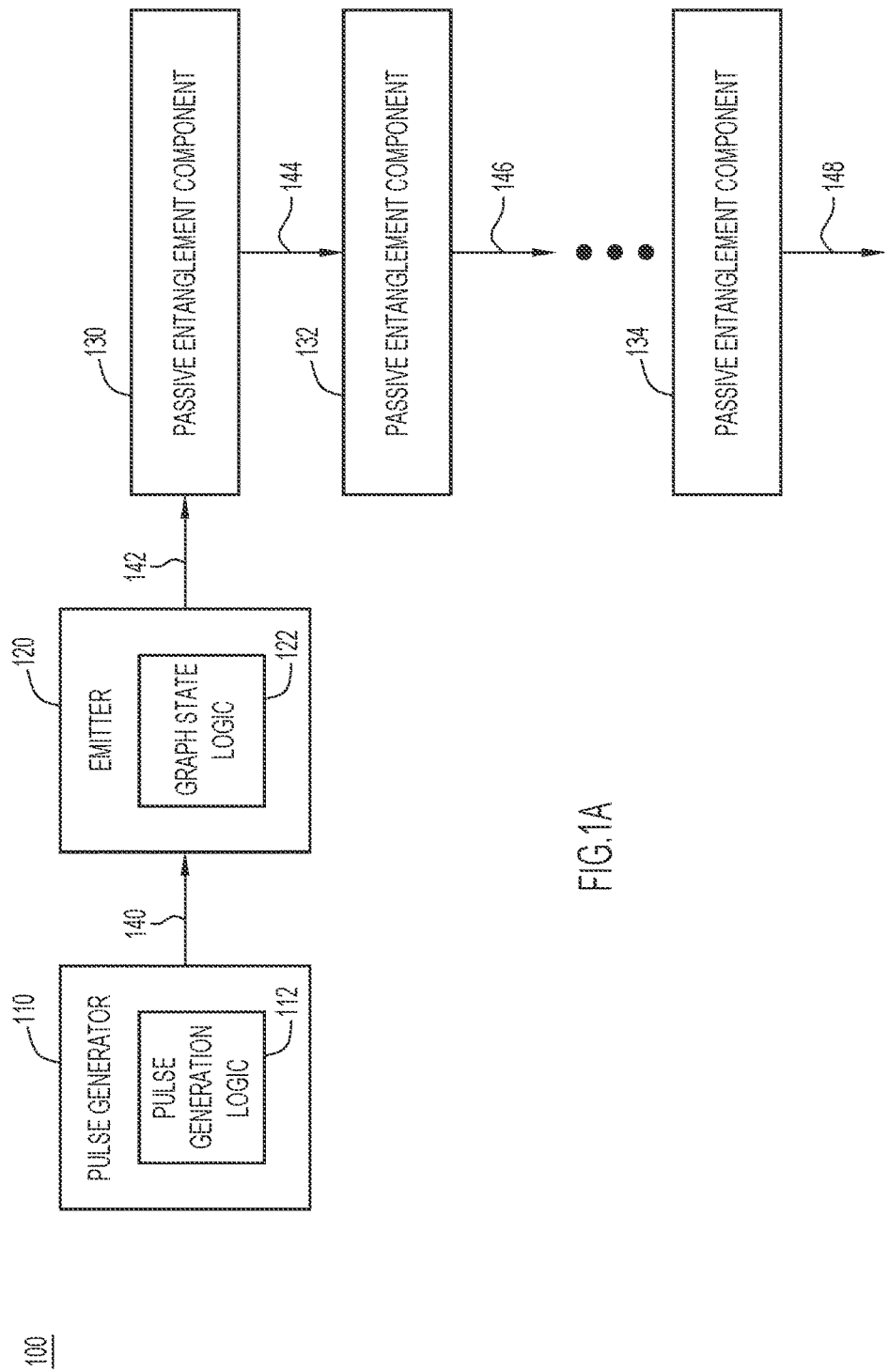
FIG. 1A is simplified block diagram of a photonic resource state generator, according to an example embodiment.

A method is provided for deterministically generating a photonic resource state for computational quantum computing. The method includes producing a sequence of emitted photonic qubits, with each emitted photonic qubit encoded with a single photon. The sequence of emitted photonic qubits is directed to a first optical circulator of a first passive component. The first passive component includes the first optical circulator, a first delay line, and a first Controlled-Z (CZ) gate. The sequence of emitted photonic qubits is reflected at the end of the first delay line to generate a sequence of reflected photonic qubits. The first delay line reflects each photon in the sequence of emitted photonic qubits as a photon in the sequence of reflected photonic qubits after a first predetermined time delay. The CZ gate entangles the sequence of emitted photonic qubits with the sequence of reflected photonic qubits. The first optical circulator directs a first resource state generated from the sequence of reflected photonic qubits entangled with the sequence of emitted photonic qubits to an output of the first passive component. The first resource state is emitted as a first sequence of entangled photonic qubits.

Example Embodiments

One approach for photonic quantum information processing is a measurement-based method which applies single qubit measurements to a multi-qubit entangled state, i.e., a resource state. Typically, photonic resource states have been generated probabilistically by randomly generating a large number of entangled resource states and selecting a resource state based on the required calculation. As the number of qubits in the resource states increases, probabilistic generation of resource states requires an increasing number of generated resource states, which presents a practical limit on the number of qubits in each resource state.

Probabilistic generation of resource states typically involve probabilistic sources of entangled photon pairs with three-wave or four-wave mixing, and feeding the output into a linear optical circuit for further probabilistic gating and post-selection of the desired resource state. The probabilistic nature of this approach to generating resource states causes a large overhead and limits the scalability of the size of resource states.

The techniques presented herein provide for deterministic generation of photonic resource states through the use of a quantum emitter, such as a semiconductor quantum dot in a nanophotonic cavity or waveguide. A deterministic photon source and nonlinear gates enable deterministic generation of photonic resource states at a high rate without a large overhead. In other words, deterministic generation of resource states essentially eliminates the need to probabilistically generate multiple states and select the desired resource state from the generated states. Additionally, recent advances in quantum dot technologies offer a great deal of quantum controllability and enables a large Purcell enhancement to produce indistinguishable photons over extended time scales.

Resource states are usually realized in the form of graph states, which presents structural advantages for future advances. Initially, graph states are stabilizer states, which allows the stabilizer formalism toolbox to be used, for instance in a quantum error correcting code. Additionally, using graph states as resource states provides room for further innovation by applying concepts from graph theory.

In the context of quantum computing, resource states in two and three dimensions provide archetypal examples of graph states that may be used for universal and fault-tolerant quantum computation. In the context of quantum networking, repeater states and loss-tolerant quantum error correcting codes, based on all-to-all connected, self-similar, and/or tree graphs may be developed as new generations of quantum communication protocols. Consequently, improved designs and implementations of photonic devices to efficiently generate resource states occupy significant roles in realizing measurement-based photonic quantum information processing.

Referring now to FIG. 1A, a block diagram illustrates a resource state generator 100 configured to deterministically generate resource states of photonic qubits. The resource state generator 100 includes a pulse generator 110 with pulse generation logic 112 and an emitter 120. In one example, the pulse generator 110 generate resonant pulses that cause the emitter 120 to alternate between different optical transitions as described further with respect to FIG. 2A. The emitter 120 generates a photonic qubit that is deterministically based on the state of the emitter 120 as prepared by resonant pulses from the pulse generator 110. The emitter 120 may also include graph state logic 122 that further prepares the emitted photonic qubits in preparation for entanglement as a resource state. For instance, graph state logic 122 may include one or more single-qubit gates that operate on each emitted photonic qubit.

The resource state generator 100 also includes a passive entanglement component 130 that is configured to entangle photons emitted by the emitter 120 into a resource state. Additional modules, such as passive entanglement components 132 and 134 may be chained to extend the dimensionality of the resulting resource state. In other words, a resource state generator with a single passive component (e.g., passive entanglement component 130) generates a two-dimensional resource state. A resource state generator 100 with two passive entanglement components (e.g., passive entanglement components 130 and 132) generates a non-planar graph (three-dimensional) resource state. A resource state generator 100 with three passive entanglement components (e.g., passive entanglement components 130, 132, and 134) generates a four-dimensional resource state. Additional passive entanglement components may be added to generate multi-dimensional resource states. In general, a resource state generator 100 with N passive entanglement components may be configured to produce an (N+1)-dimensional resource state.

In operation, the pulse generation logic 112 causes the pulse generator 110 to emit a sequence 140 of resonant pulses directed at the emitter 120. In response to the sequence 140 of resonant pulses, the emitter 120 generates a sequence 142 of photonic qubits which form a one-dimensional resource state. The sequence 142 of emitted photonic qubits enters the input of the first passive entanglement component 130, which selectively entangles the emitted photonic qubits to generate a sequence 144 of entangled photonic qubits that is a two-dimensional resource state. The configuration of the passive entanglement component 130 along with the timing of the input sequence 142 of photonic qubits determines the form of the two-dimensional resource state embodied by the sequence 144 of entangled photonic qubits.

To generate a three-dimensional resource state, the sequence 144 of entangled photonic qubits is directed to the input of the passive entanglement component 132, which further selectively entangles the photonic qubits of the sequence 144 to generate a sequence 146 of photonic qubits that is a three-dimensional resources state. Additional passive entanglement components, such as passive entanglement component 134, may be chained to further increase the dimensionality of the output sequence 148 of photonic qubits. The sequence 148 of photonic qubits is an (N+1)-dimensional resource state after being selectively entangled by N modules of passive entanglement components.

Figure 1B:
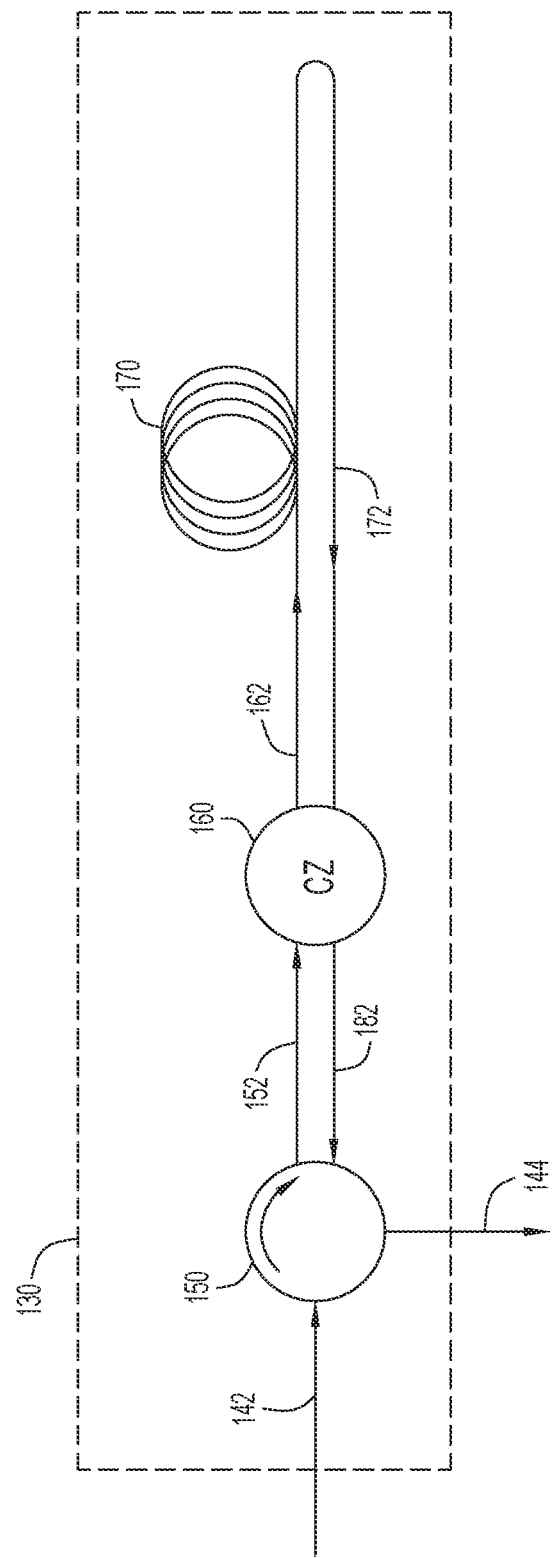
FIG. 1B is block diagram illustrating passive components of the photonic resource state generator, according to an example embodiment.

Referring now to FIG. 1B, an example of the operation of the passive entanglement component 130 is shown. The passive entanglement component 130 includes an input that direct the sequence 142 of emitted photonic qubits to an optical circulator 150. The optical circulator 150 sends a sequence 152 of photonic qubits to a Controlled-Z (CZ) gate 160, where each photonic qubit of the sequence 152 acts as a control for a phase flip operation, i.e., a Pauli Z gate.

After travelling through the CZ gate 160, the sequence 162 of photonic qubits is directed to a delay line 170 that holds the photons for a predetermined length of time, e.g., through a predetermined length of optical fiber. The sequence 162 of photonic qubits is reflected back to the CZ gate 160 as a sequence 172 of reflected photonic qubits after the predetermined length of time. In one example, the delay line 170 may be terminated by a reflector (e.g., a mirror) and the sequence 172 of reflected photonic qubits may travel through the delay line 170 again on the path back to the CZ gate 160. Alternatively, the delay line 170 may loop back to CZ gate 160.

In the CZ gate 160, each reflected qubit in the sequence 172 is the target qubit subject to a phase flip operation under the control of an emitted qubit in the sequence 152, which generates an entangled state between the two qubits. The exact qubits that are entangled by the CZ gate 160 is determined by the timing of the sequence 152 of the emitted photonic qubits and the length of the delay line 170. The CZ gate 160 directs the sequence 182 of entangled photonic qubits to the optical circulator 150, and the optical circulator 150 directs the sequence 182 of entangled photonic qubits to the output of the passive entanglement component 130 as a resource state embodied in the sequence 144 of entangled photonic qubits.

Figure 2A:
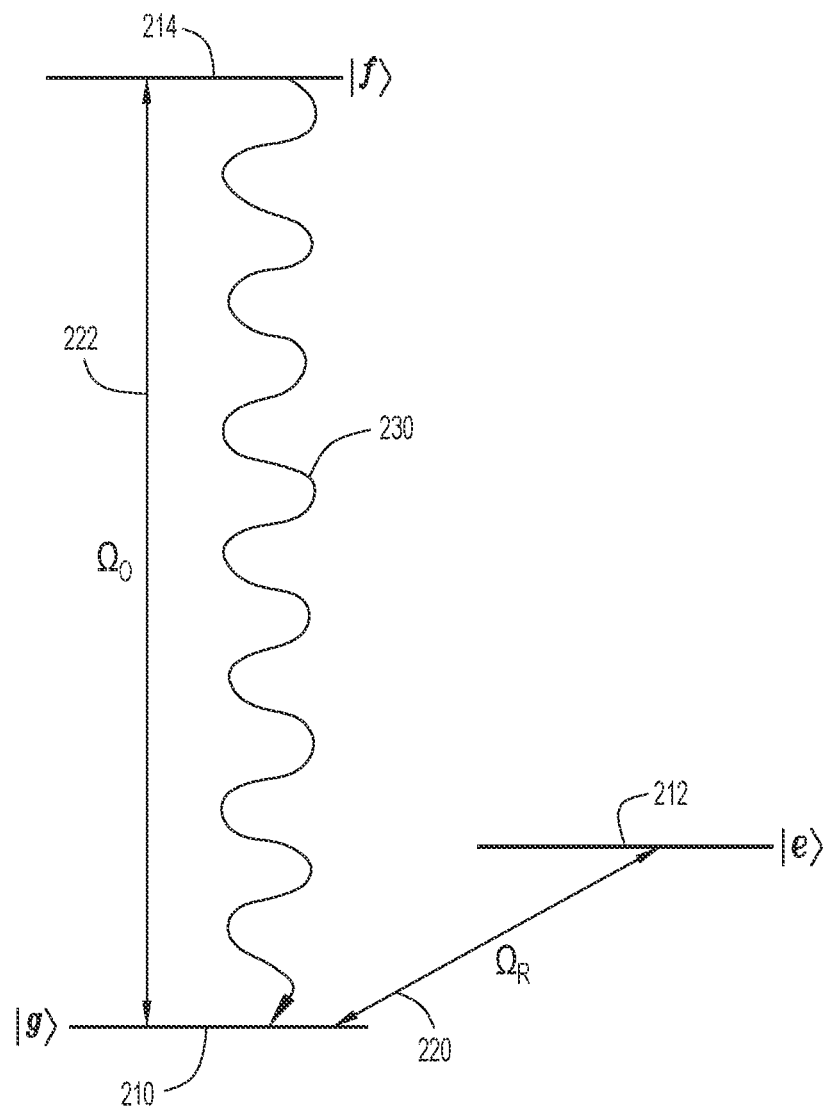
FIG. 2A illustrates the energy levels of the quantum dot configured to emit photons for the photonic qubits, according to an example embodiment.

Referring now to FIG. 2A, an energy level diagram illustrates how an emitter (e.g., emitter 120) of photons responds to resonant pulses (e.g., from pulse generator 110) to effectively act as a controlled-NOT gate in which the control qubit is the emitter and the target qubit is a photonic qubit. The emitter includes a first ground state 210, a second ground state 212, and an excited state 214. The emitter may transition between the first ground state 210 and the second ground state 212 by applying a resonant pulse 220 at a Rabi frequency $\Omega_R$. In one example, the first ground state 210 and the second ground state 212 correspond to electron or hole spin degree of freedom. The emitter may also transition between the first ground state 210 and the excited state 214 by applying a resonant pulse 222 at a Rabi frequency $\Omega_0$. However, the transition between the second ground state 212 and the excited state 214 is not active. From the excited state 214, the emitter returns to the first ground state 210 by emitting a photon 230.

The resonant pulse generator controls the logical state of the emitter, i.e., whether the emitter is in the first ground state 210 or the second ground state 212, by applying resonant pulses 220 at a Rabi frequency $\Omega_R$. In one example, the resonant pulses 220 may be driven detuned Raman laser, and the resonant pulses 222 may drive an optical dipole transition.

Figure 2B:
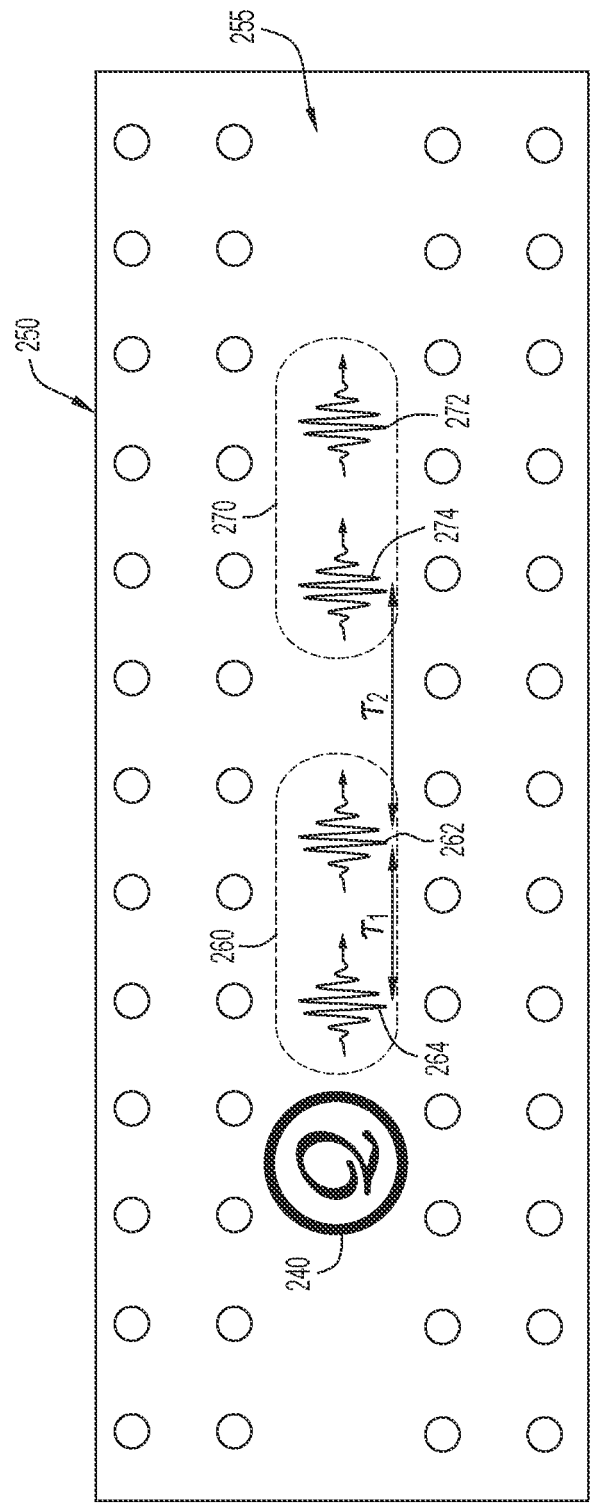
FIG. 2B illustrates the emitter deterministically generating photonic qubits, according to an example embodiment.

Referring now to FIG. 2B, a diagram illustrates an example of time-bin encoding of photonic qubits. A quantum dot 240 is incorporated into a nanophotonic matrix 250 with a waveguide 255 to guide emitted photons from the quantum dot 240. The quantum dot 240 encodes quantum information in a photonic qubit 260 based on the timing of the emitted photon in the photonic qubit 260. If the quantum dot 240 emits an early photon 262, then the photonic qubit 260 is in a first state. If the quantum dot 240 emits a late photon 264, then the photonic qubit 260 is in a second state. Similarly, a photonic qubit 270 is defined by an early photon 272 and a late photon 274. In other words, the state of the photonic qubit 260 may be measured by the time of arrival of a photon within the time frame of the photonic qubit 260.

The time-bin encoding scheme defines an intra-qubit time delay $T_1$ between the early photon (e.g., early photon 262) and the late photon (e.g., late photon 264). An inter-qubit time delay $T_2$ separates the photonic qubits. For instance, the early photon 262 of photonic qubit 260 is defined as being separated from the late photon 274 of the photonic qubit 270 by the inter-qubit time delay $T_2$.

In another example, the intra-qubit time delay $T_1$ and the inter-qubit time delay $T_2$ may vary for different qubits in a resource state. For instance, qubits in a binary tree resource state may have different values for $T_1$ and $T_2$ to enable the appropriate entanglement connections between qubits.

Two advantages of using this encoding scheme are that single-qubit gates may be implemented and dephasing error may be suppressed. One potential challenge of using this encoding scheme may be implementing a CZ gate between the emitter and photonic qubits, where a simple scattering off the emitter is not effective since there would be a π-phase shift regardless of the logical state of the photonic qubit.

In a further example, the quantum dot 240 may be initialized into a Hadamard state by sending a resonant π/2-pulse at the Rabi frequency $\Omega_R$ that transitions between the two ground states of the quantum dot 240. To generate a time-bin encoded qubit (e.g., photonic qubit 260) the pulse generator (e.g., pulse generator 110) applies a sequence of a first resonant π-pulse at the Rabi frequency $\Omega_0$, followed by a resonant π-pulse at the Rabi frequency $\Omega_R$, a second resonant π-pulse at the Rabi frequency $\Omega_0$, and another resonant π-pulse at the Rabi frequency $\Omega_R$. After each pulse at the Rabi frequency $\Omega_0$ the emitter is given time for a possible spontaneous emission.

In other words, the initial resonant π/2-pulse at the Rabi frequency $\Omega_R$ puts the emitter in a state of equal probability between the first ground state 210 and the second ground state 212. The first resonant π-pulse at the Rabi frequency $\Omega_0$ generates the state of the early photon 262, and the second resonant π-pulse at the Rabi frequency $\Omega_0$ generates the state of the late photon 264.

The emission process effectively acts as a controlled NOT gate with the quantum dot 240 as the control qubit. By applying periodic resonant pulses, the quantum dot 240 generates an array of time-ordered photonic qubits in a desired graph state. In particular, the quantum dot 240 may generate linear cluster states, star graph states, and single qubits in Hadamard states. The basic timing requirement for distinct photonic qubits is $\gamma T_1 \gg 1$, where γ is the emitter decay rate. For instance, a quantum dot with γ~1-100 GHz can accommodate photon emission rates of $T_1$~0.1-10 nanoseconds.

Referring now to FIG. 2C, a diagram illustrates the use of an array of quantum dots as a CZ gate (e.g., CZ gate 160) between two time-bin encoded photonic qubits. In the nanophotonic matrix 250, an array 280 comprising quantum dots 282, 284, and 286 acts as a CZ gate for a photonic qubit 260 travelling in one direction and a photonic qubit 290 travelling in the opposite direction. The two states of the photonic qubit 260 are defined by the early photon 262 and the late photon 264. Similarly, the two states of the photonic qubit 290 are defined by the early photon 292 and the late photon 294.

The single photon in the photonic qubit 290 scattering off the array 280 generates a π-phase shift regardless of the logical state of the photonic qubit 290 (e.g., early photon 292 or late photon 294). However, if two photons simultaneously pass through the array 280, then there is no phase shift. To cause the array 280 to act as a CZ gate (e.g., CZ gate 160), the photonic qubit 290 may be scheduled to arrive at the array 280 slightly before than the photonic qubit 260 such that only the early photon 292 overlaps with the late photon 264 of the photonic qubit 260. In this case, the absence of a π-phase shift only for the early photon 292 basis of the photonic qubit 290 results in a CZ gate with the photonic qubit 260 as a control qubit and the photonic qubit 290 as the target qubit.

Alternatively, the photonic qubit 290 may be scheduled to arrive slightly after the photonic qubit 260 such that only the late photon 294 overlaps with the early photon 262 of the photonic qubit 260. The net effect of the absence of r-phase shift in only one combination of basis states results in a CZ gate with the photonic qubit 260 as a control qubit and the photonic qubit 290 as the target qubit.

In one example, the timing of the arrival of the emitted photonic qubits (e.g., from the sequence 152 as shown in FIG. 1B) and the arrival of reflected photonic qubits (e.g., from the sequence 172 as shown in FIG. 1B) may be controlled by the length of the delay line 170. By controlling the length of the delay line 170 and the timing of the sequence 142 of emitted photonic qubits, an array 280 of quantum dots becomes an effective CZ gate 160 for time-bin encoded photonic qubits.

Figure 3A:
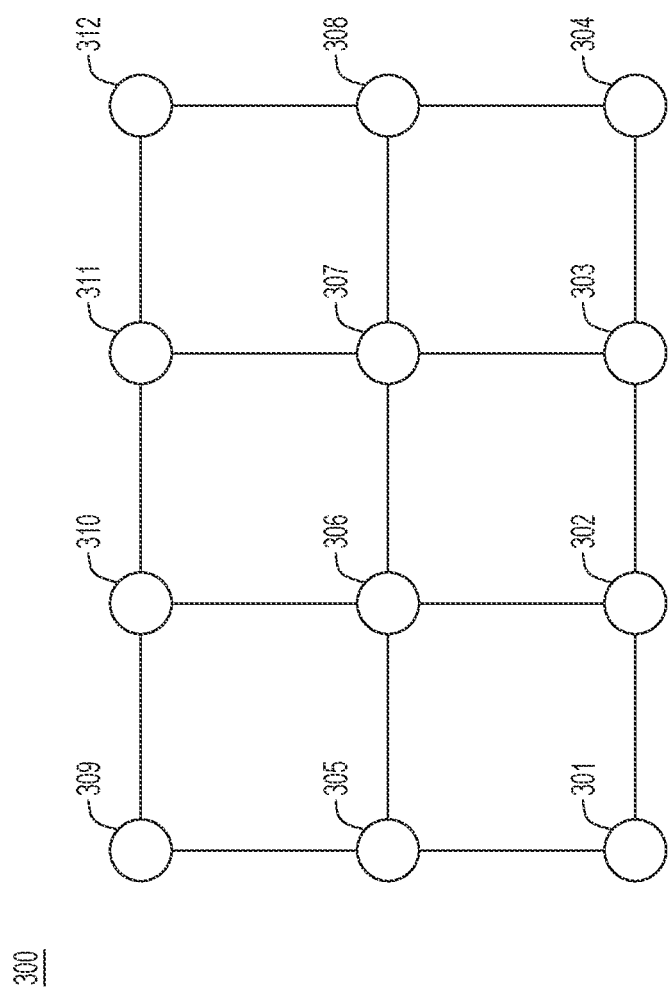
FIG. 3A illustrates a simple two-dimensional resource state, according to an example embodiment.

Referring now to FIG. 3A, a two-dimensional graph is shown that may be generated using the techniques described herein for a resource state 300. The resource state 300 includes qubits 301-312 arranged in a 4×3 rectangular lattice. Each edge connection in the resource state 300 indicates two entangled qubits. For instance, the qubit 301 is entangled with the qubit 302 and the qubit 305. The resource state 300 represents a sequence of photonic qubits generated according to the techniques described herein with one passive entanglement component (e.g., passive entanglement component 130) entangling the adjacent qubits in each row (e.g., qubit 301 and qubit 302). A second passive entanglement component (e.g., passive entanglement component 132) entangles adjacent qubits in each column (e.g., qubit 301 and qubit 305).

Figure 3B:
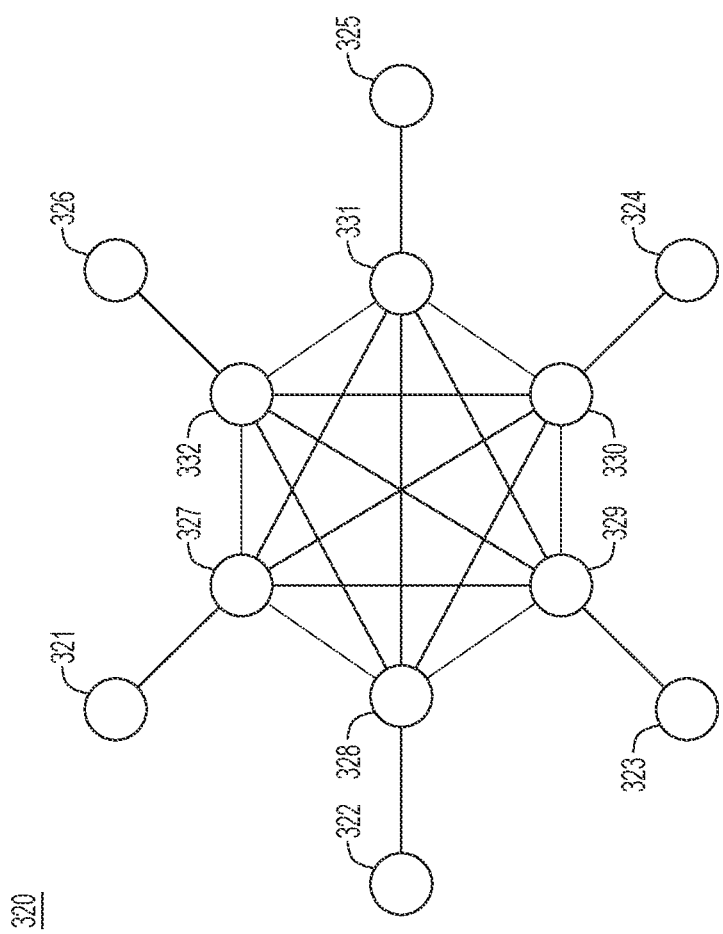
FIG. 3B illustrates a two-dimensional resource state configured as a repeater state, according to an example embodiment.

Referring now to FIG. 3B, a two-dimensional graph state 320 is shown that may be used as a repeater state 320, e.g., as part of a photonic repeater for quantum states. The repeater state 320 includes outer qubits 321-326 and six all-to-all connected qubits 327-332. In other words, the outer qubits 321-326 are connected to the qubits 327-332, respectively, and qubits 327-332 are also connected to each other. In one example, a repeater state may be used for amplifying quantum signals across a quantum repeater between distant endpoints. Instead of sending one qubit of a Bell pair to a remote endpoint, multiple qubits (e.g., the left/right half of the repeater state 320) are sent and multiple fusion gates are performed on the outer qubits (e.g., qubits 321-326). Depending on the fusion outcomes, the inner qubits (e.g., qubits 327-332) are measured to complete a Bell link between two endpoints, which may be repeated across multiple repeater stations.

Figure 3C:
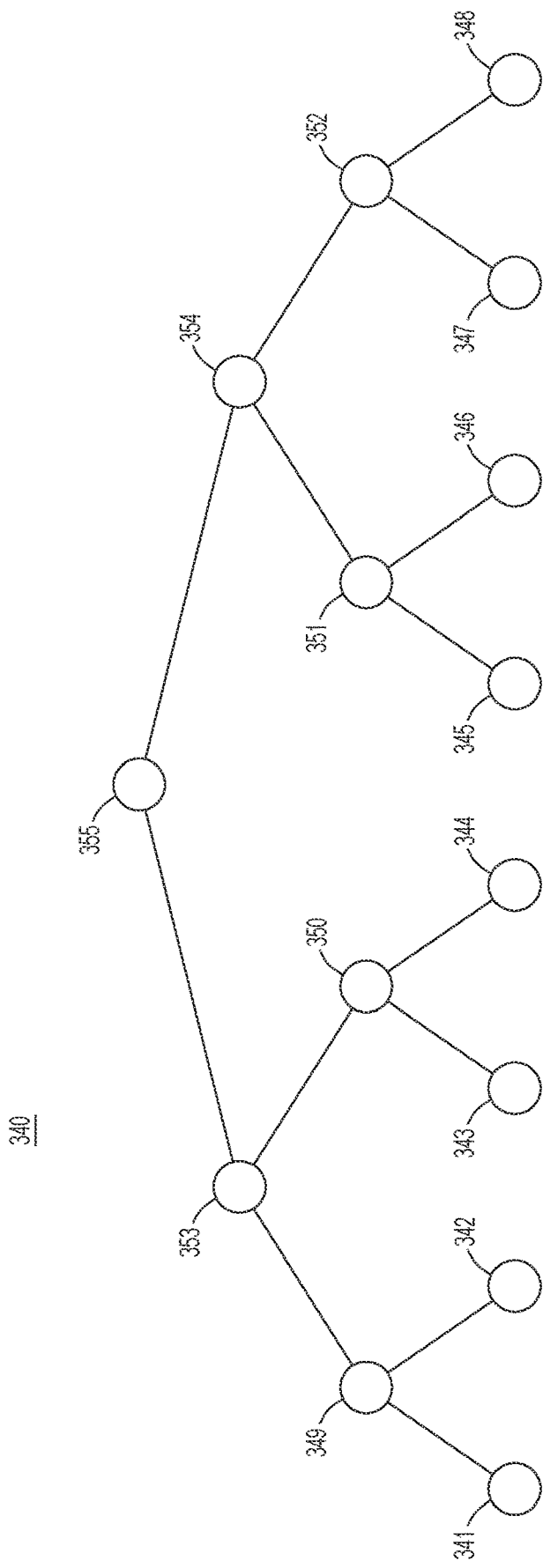
FIG. 3C illustrates a two-dimensional resource state configured as a binary tree state, according to an example embodiment.

Referring now to FIG. 3C, a two-dimensional graph state 340 is shown that may be used as a binary tree state 340 for quantum error correction. The tree state 340 includes four layers with two qubits of each layer entangled with a single qubit in the next higher layer. For instance, the first layer includes qubits 341-348. The second layer includes qubit 349 connected to qubits 341 and 342, qubit 350 connected to qubits 343 and 344, qubit 351 connected to qubits 345 and 346, and qubit 352 connected to qubits 347 and 348. The third layer includes qubit 353 connected to qubits 349 and 350, and qubit 354 connected to qubits 351 and 352. The fourth layer includes qubit 355 connected to qubits 353 and 354.

In one example, all three of the graph states 300, 320, and 340 may be obtained by a sequence of photonic qubits in a Hadamard basis and passive entanglement components with CZ gates and delay lines (e.g., passive entanglement component 130). The resource state generator 100 may use a typical quantum dot (i.e., a two-level system) as a single photon emitter and a linear optical circuit to generate qubits in a Hadamard basis using time-bin encoding. The specific form of the resource state (e.g., graph state 300, 320, 340, or other graph states) may be determined by the pattern of exciting a quantum dot emitter (e.g., emitter 120) and the number and configuration of passive entanglement components (e.g., passive entanglement component 130). For instance, the length of a delay line in a passive entanglement component may be selected to ensure that specific emitted photonic qubits and reflected photonic qubits interact through the CZ gate in the passive entanglement component.

Figure 4:
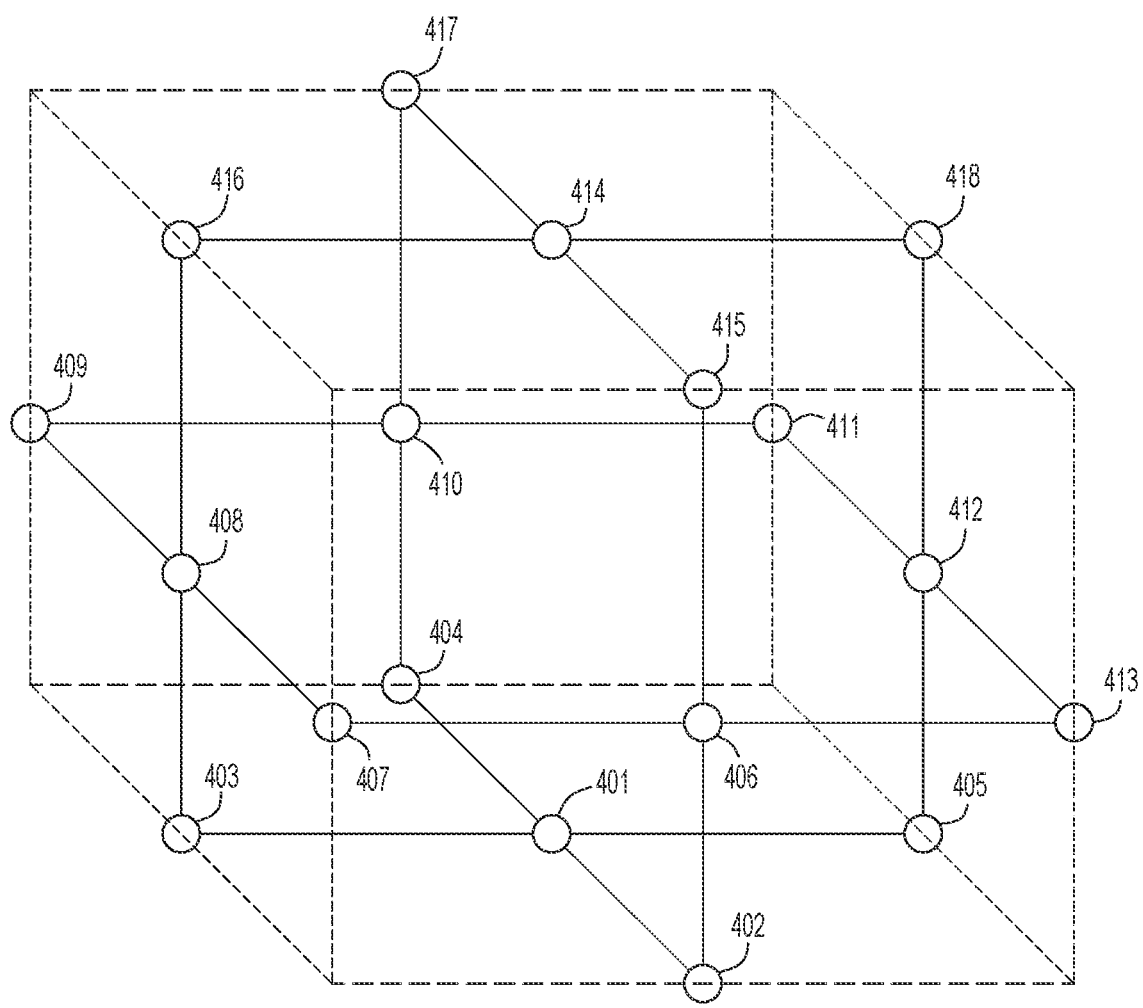
FIG. 4 illustrates a three-dimensional graph state configured on a Raussendorf-Harrington-Goyal (RHG) lattice, according to an example embodiment.

Referring now to FIG. 4, a three-dimensional graph state 400 on a Raussendorf-Harrington-Goyal (RHG) is shown that may be used as a resource state 400 for fault tolerant quantum computing. In FIG. 4, solid lines represent edges in the graph state (i.e., entanglement connections) and dashed lines show the three-dimensional cubic nature of the RHG resource state 400. The RHG resource state 400 includes qubits on three two-dimensional layers, with the upper and lower layers comprising five qubits in a star configuration, and the middle layer comprising eight qubits in a square configuration. Specifically, the lower layer includes a qubit 401 at the center and entangled with qubits 402-405. The middle layer includes qubits 406-413 with each qubit in the middle layer entangled with the two neighboring qubits. The upper layer includes a qubit 414 at the center and entangled with qubits 415-418. The qubits 406, 408, 410, and 412 in the middle layer stitch together upper and lower layers through entanglements with qubits 402/415, 403/416, 404/417, and 405/418, respectively.

Figure 5:
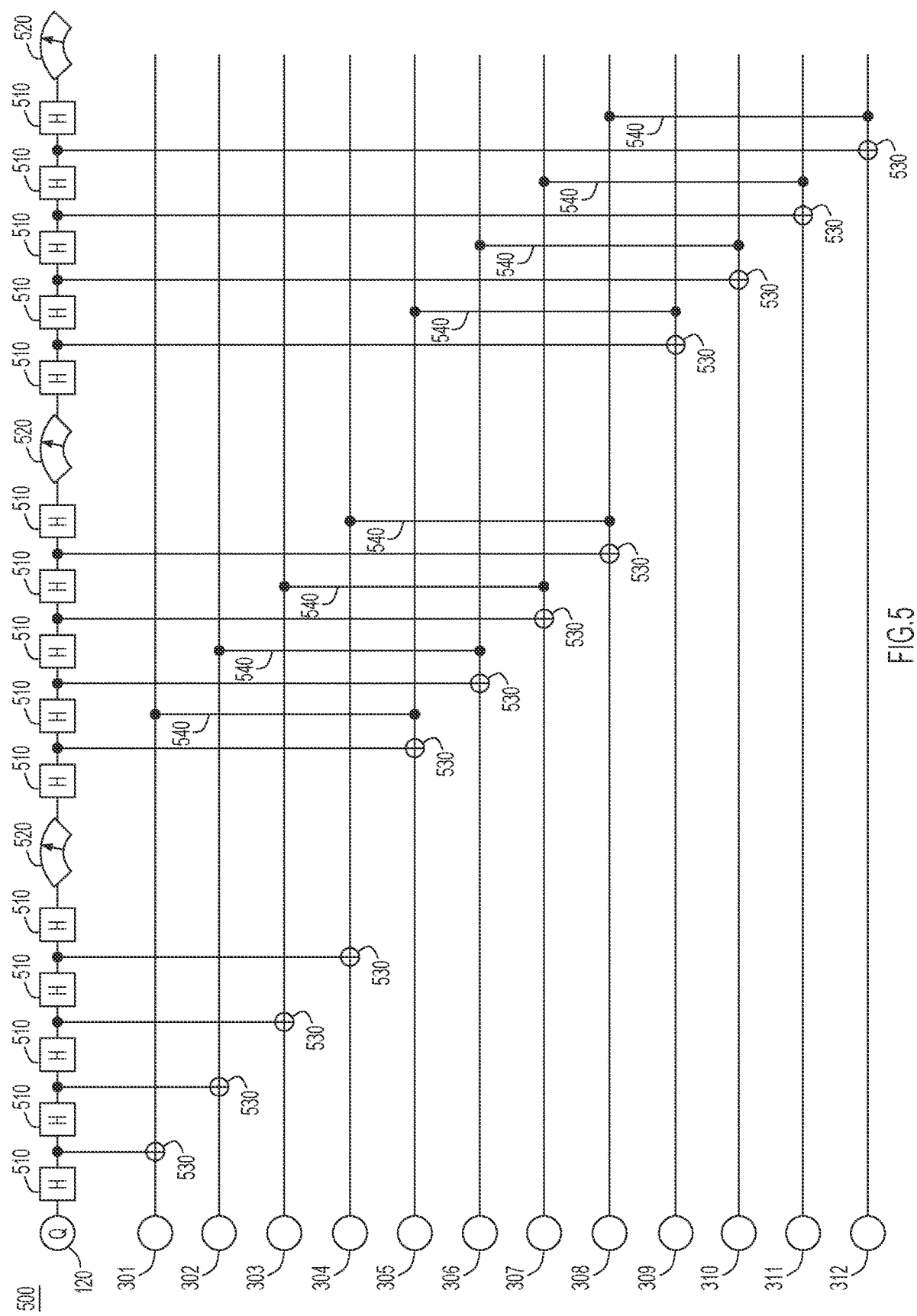
FIG. 5 illustrate an effective quantum circuit to generate a simple two-dimensional resource state, according to an example embodiment.

Referring now to FIG. 5, an effective quantum circuit 500 shows an example of generating a two-dimensional resource state 300 with qubits 301-312 as shown in FIG. 3A. The effective quantum circuit 500 includes Hadamard gates 510, measurements 520, controlled NOT gates 530 and CZ gates 540. To prepare the qubit 301, the effective quantum circuit 500 applies a Hadamard gate 510 to the emitter 120 and then applies a controlled NOT gate 530 with the emitter 120 as the control and the qubit 301 as target of the controlled NOT gate 530. By alternating Hadamard gates 510 and controlled NOT gates 530, the effective quantum circuit 500 prepares the remaining qubits 302, 303, and 304 in the first row of the resource state 300. After the first row of the qubits 301-304 is prepared, the emitter 120 is effectively reset by performing a measurement 520 between the application of Hadamard gates 510.

The second row of qubits 305-308 is prepared with the same alternating application of Hadamard gates 510 and controlled NOT gates 530, but with the additional application of CZ gates 540 with the qubits 301, 302, 303, and 304 as the control and qubits 350, 306, 307, and 308 as the target, respectively. After the second row of the qubits 305-308 is prepared, the emitter is again effectively reset by performing a measurement 520 between the application of Hadamard gates 510. Similarly, the third row of qubits 309-312 is prepared with the sequential application of Hadamard gates 510, controlled NOT gates 530, and CZ gates 540 to stitch the third row of qubits 309-312 to the second row of qubits 305-308. The effective quantum circuit 500 ends with the application of a measurement 520 of the emitter 120.

Figure 6:
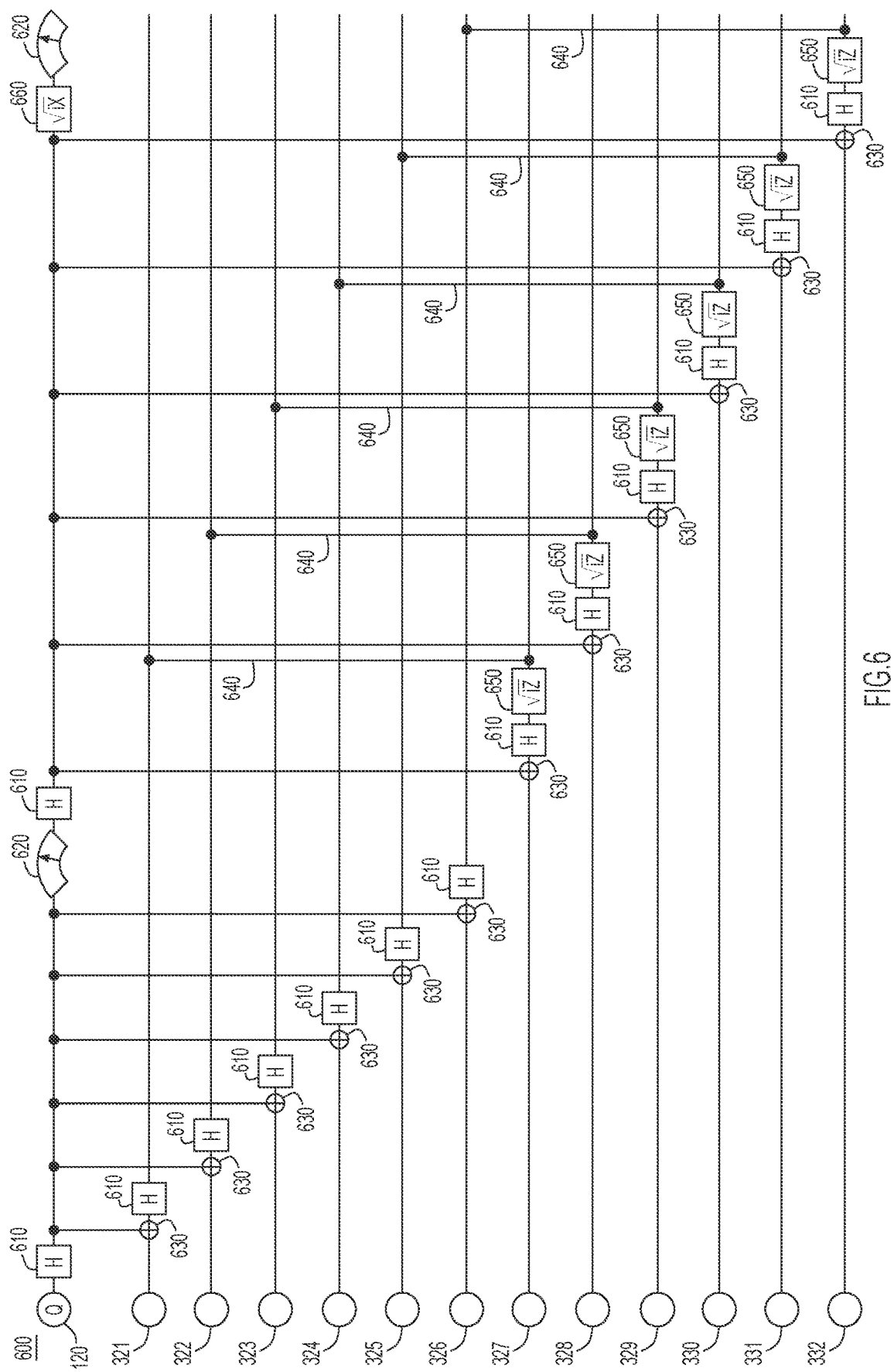
FIG. 6 illustrate an effective quantum circuit to generate a two-dimensional resource state with configured as a repeater state, according to an example embodiment.

Referring now to FIG. 6, an effective quantum circuit 600 shows an example of generating a repeater state 320 with qubits 321-332 as shown in FIG. 3B. The effective quantum circuit 600 includes Hadamard gates 610, measurements 620, controlled NOT gates 630, CZ gates 640, $\sqrt{iZ}$ gates 650, and $\sqrt{iX}$ gate 660. The emitter 120 is initialized with a Hadamard gate 610, and then outer qubits 321-326 are each prepared with a controlled NOT gate 630 followed by a Hadamard gate 610. After the outer qubits 321-326 are prepared, the emitter 120 is re-initialized by a measurement 620 and a Hadamard gate 610 in preparation for generating the inner qubits 327-332.

Each of the inner qubits 327-332 are prepared by a sequence of a controlled NOT gate 630, a Hadamard gate 610, and a $\sqrt{iZ}$ gate 650 before being stitched to one of the outer qubits 321-326 by a CZ gate 640. To complete the preparation of the inner qubits 327-332 the emitter 120 is acted on by the $\sqrt{iX}$ gate 660 and a measurement 620. In one example, the order of the single qubit gates (i.e., the Hadamard gate 610 and the $\sqrt{iZ}$ gate 650) may be reversed, since the single qubit gates commute with each other.

Figure 7A:
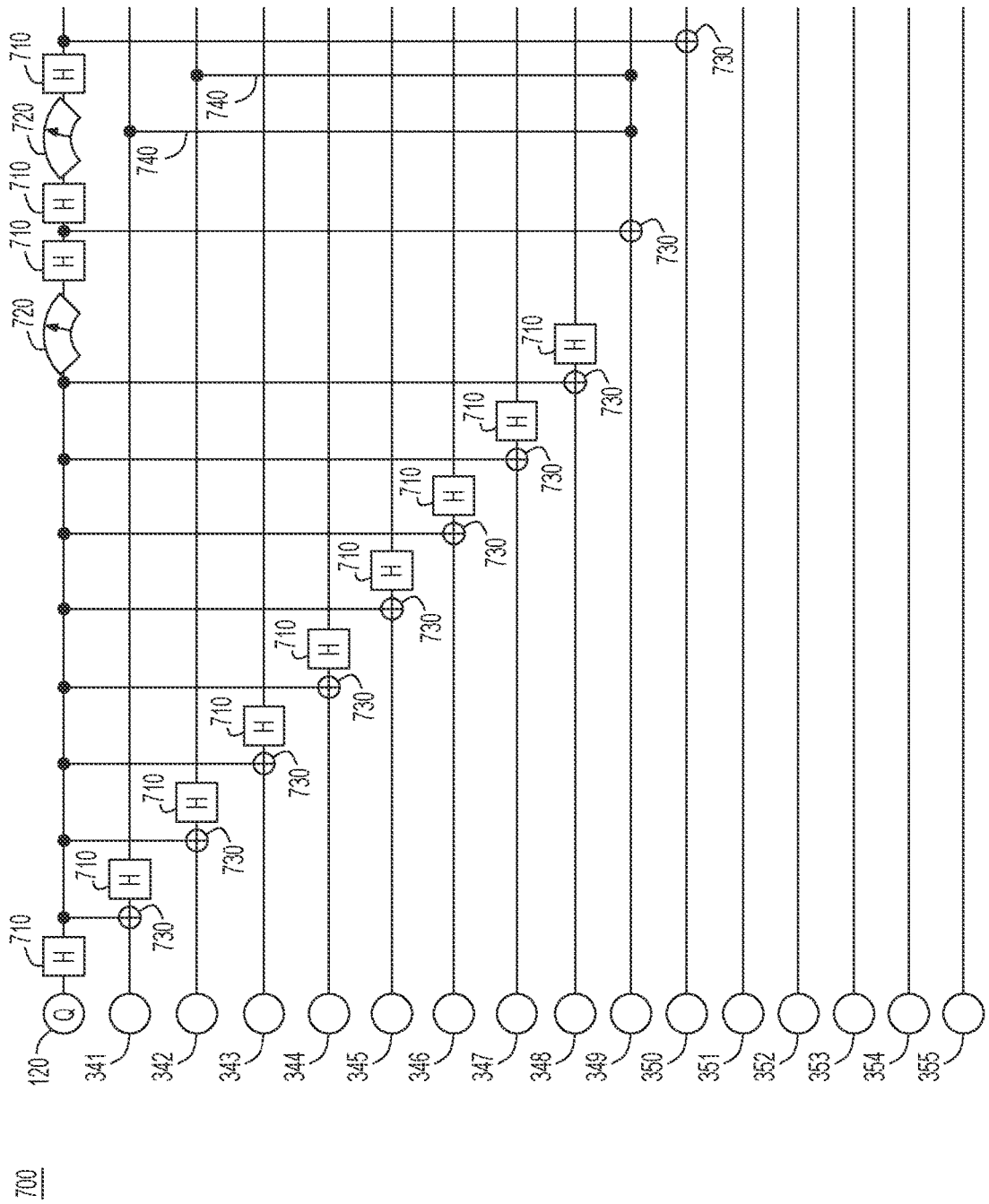
FIGS. 7A and 7B illustrate an effective quantum circuit to generate a two-dimensional resource state configured as a binary tree state, according to an example embodiment.
Figure 7B:
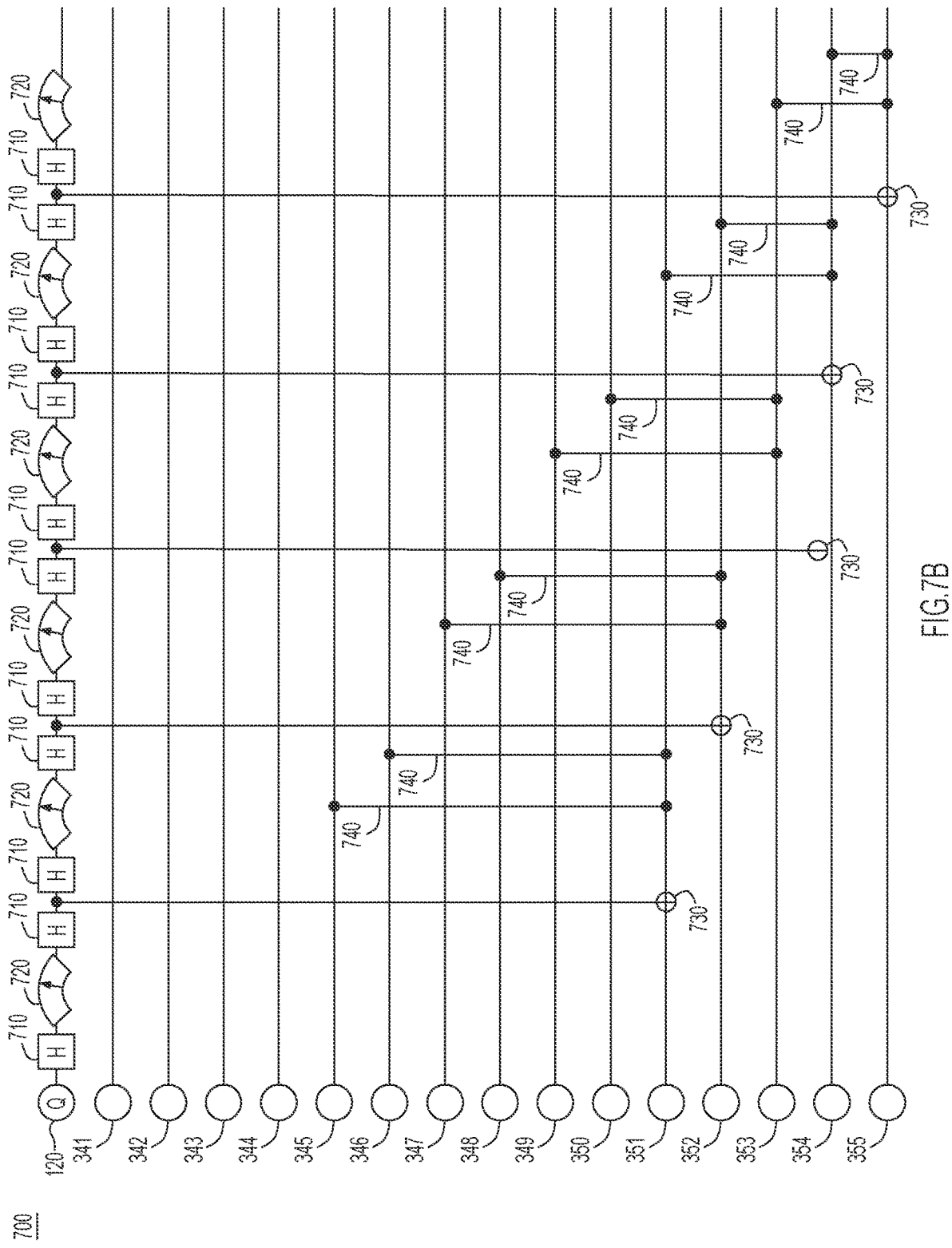

Referring now to FIG. 7A and FIG. 7B, an effective quantum circuit 700 shows an example of generating a binary tree state 340 with qubits 341-355 as shown in FIG. 3C. The effective quantum circuit 700 includes Hadamard gates 710, measurements 720, controlled NOT gates 730, and CZ gates 740. As shown in FIG. 7A, after the emitter 120 is prepared with a Hadamard gate 710, each qubit in the lowest layer (e.g., qubits 341-348) is prepared with a controlled NOT gate 730 and a Hadamard gate 710.

A measurement 720 followed by a Hadamard gate 710 re-initializes the emitter 120 and the first qubit of the second layer (e.g., qubit 349) is generated by a controlled NOT gate 730 before being entangled with the two qubits in the first layer (e.g., qubits 341 and 342) with CZ gates 740 that with control qubits of the two qubits from the first layer. Between the preparation of each higher layer qubit (e.g., qubits 349-355) the emitter 120 is re-initialized with a measurement 720 between Hadamard gates 710. As shown in FIG. 7B the remaining higher layer qubits (e.g., qubits 350-355) are prepared in a similar manner as the qubit 349 with a controlled NOT gate 730 to generate the qubit and two CZ gates 740 to entangle the higher layer qubit to two lower layer qubits. For instance, qubit 351 is entangled with qubits 345 and 346, qubit 352 is entangled with qubits 347 and 348, qubit 353 (e.g., a third layer qubit) is entangled with qubits 349 and 350, qubit 354 is entangled with qubits 351 and 352, and qubit 355 (e.g., the fourth layer qubit) is entangled with qubits 353 and 354.

Figure 8:
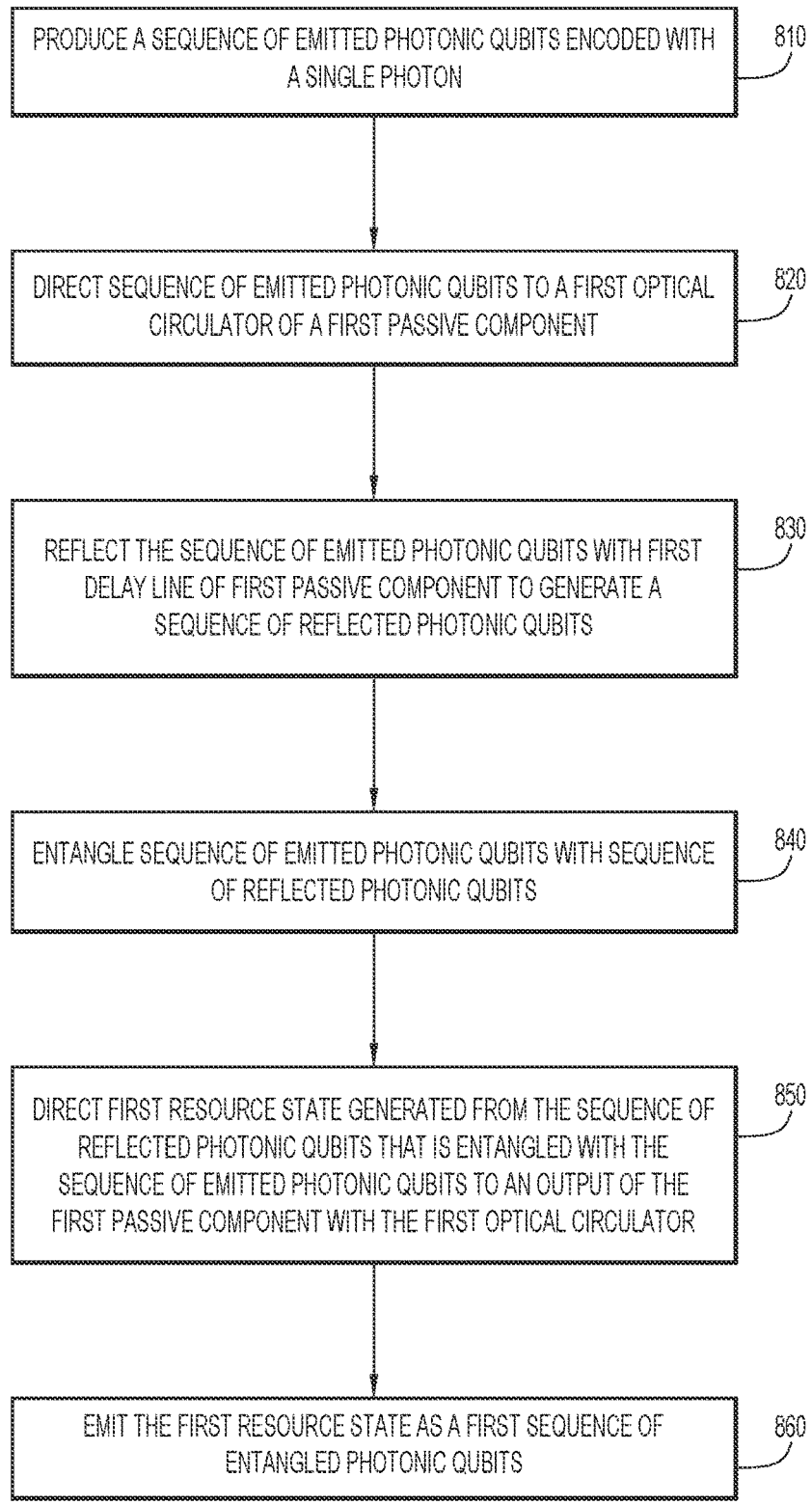
FIG. 8 is a flowchart illustrating operations performed by a hybrid network element to process a networking frame with a classical header and a quantum payload, according to an example embodiment.

Referring now to FIG. 8, a flowchart illustrates an example, process 800 performed by a resource state generator (e.g., resource state generator 100) to deterministically generate resource states for computational quantum computing. At 810, a sequence of emitted photonic qubits is produced. Each emitted photonic qubit is encoded with a single photon. In one example, each emitted photonic qubit is encoded with time-bin encoding of a basis consisting of an early photon and a late photon. In another example, the sequence of emitted photonic qubits may be emitted by a quantum dot emitter of single photons.

At 820, the sequence of emitted photonic qubits is directed to a first optical circulator of a first passive component. The first passive component comprises the first optical circulator, a first delay line, a first CZ gate. At 830, the sequence of emitted photonic qubits is reflected at the end of the first delay line to generate a sequence of reflected photonic qubits. The first delay line reflects each photon in the sequence of emitted photonic qubits as a photon in the sequence of reflected photonic qubits after a first predetermined delay. In one example, the first delay line may be terminated with an optical reflector that generates the sequence of reflected photonic qubits.

At 840, the sequence of emitted photonic qubits is entangled with the sequence of photonic qubits at the first CZ gate. In one example, the specific emitted photonic qubit and reflected photonic qubit that are entangled is based on the length of the first delay line (i.e., the first predetermined delay).

At 850, the first optical circulator directs a first resource state to an output of the first passive component. The first resource state is generated from the sequence of reflected photonic qubits that is entangled with the sequence of emitted photonic qubits. In one example, the form of the first resource state (e.g., repeater state, tree resource state) is based on the first predetermined delay from the first delay line and the timing of the sequence of emitted photonic qubits. At 860, the first resource state is emitted as a first sequence of entangled photonic qubits. In one example, the first sequence of entangled photonic qubits may be provided to a one or more additional passive component to generate a multi-dimensional resource state.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein provide a modular design based on quantum dot emitters coupled to a waveguide and optical delay lines to deterministically generate N-dimensional resource states and other useful graph states, such as repeater states and binary tree states. The resource state is provided as a sequence of time-bin encoded photonic qubits that is less sensitive to dephasing than typical presence/absence encoding of photonic qubits. The timing pattern of the photonic qubits, the total number of passive entanglement components, and the configuration of the passive entanglement components determines the form and dimensionality of the resource state.

In some aspects, the techniques described herein relate to a method including: producing a sequence of emitted photonic qubits, wherein each emitted photonic qubit in the sequence of emitted photonic qubits is encoded with a single photon; directing the sequence of emitted photonic qubits to a first optical circulator of a first passive component, the first passive component including the first optical circulator, a first delay line, and a first Controlled-Z (CZ) gate; reflecting the sequence of emitted photonic qubits at an end of the first delay line to generate a sequence of reflected photonic qubits, wherein the first delay line reflects each photon in the sequence of emitted photonic qubits as a photon in the sequence of reflected photonic qubits after a first predetermined time delay; entangling the sequence of emitted photonic qubits with the sequence of reflected photonic qubits at the first CZ gate; directing a first resource state with the first optical circulator to an output of the first passive component, the first resource state generated from the sequence of reflected photonic qubits that is entangled with the sequence of emitted photonic qubits; and emitting the first resource state as a first sequence of entangled photonic qubits.

In some aspects, the techniques described herein relate to a method, further including: directing the first resource state to a second optical circulator of a second passive component, the second passive component including the second optical circulator, a second delay line, and a second CZ gate; reflecting the first sequence of entangled photonic qubits of the first resource state at an end of the second delay line to generate a second sequence of reflected photonic qubits, wherein the second delay line reflects each photon in the first resource state as a photon in the second sequence of reflected photonic qubits after a second predetermined time delay and; entangling the first sequence of entangled photonic qubits with the second sequence of reflected photonic qubits at the second CZ gate; directing a second resource state with the second optical circulator to an output of the second passive component, the second resource state generated from the second sequence of reflected photonic qubits that is entangled with the first resource state; and emitting the second resource state as a second sequence of entangled photonic qubits.

In some aspects, the techniques described herein relate to a method, further including generating a multi-dimensional resource state by directing the first resource state to a plurality of additional passive components, wherein each additional passive component of the plurality of additional passive components includes a respective optical circulator, a respective delay line with a respective predetermined time delay, and a respective CZ gate.

In some aspects, the techniques described herein relate to a method, wherein a dimensionality of the multi-dimensional resource state is determined by a total number of passive components in the plurality of additional passive components and the respective predetermined time delay of each additional passive component.

In some aspects, the techniques described herein relate to a method, wherein producing the sequence of emitted photonic qubits includes exciting a quantum dot with a predetermined timing pattern to generate the sequence of emitted photonic qubits.

In some aspects, the techniques described herein relate to a method, wherein the predetermined timing pattern determines a form of the first resource state.

In some aspects, the techniques described herein relate to a method, wherein each photonic qubit in the first resource state is time-bin encoded such that a state of each photonic qubit is measured by a time of arrival of the single photon within a time frame of each photonic qubit.

In some aspects, the techniques described herein relate to a method, wherein entangling the sequence of emitted photonic qubits with the sequence of reflected photonic qubits at the first CZ gate includes directing the sequence of emitted photonic qubits and the sequence of reflected photonic qubits at an array of quantum dots acting as the first CZ gate by generating a $\pi$-phase shift in each emitted photonic qubit and in each reflected photonic qubit that passes through the array of quantum dots unless the single photons of a particular emitted photonic qubit and a particular reflected photonic qubits overlap when passing through the array of quantum dots.

In some aspects, the techniques described herein relate to an apparatus including: an emitter configured to produce a sequence of emitted photonic qubits, wherein each photonic qubit in the sequence of emitted photonic qubits is encoded with a single photon; and a first passive component configured to generate a first resource state, the first passive component including: a first delay line configured to generate a sequence of reflected photonic qubits by reflecting each photon of the sequence of emitted photonic qubits after a first predetermined time delay; a first Controlled-Z (CZ) gate configured to entangle the sequence of emitted photonic qubits with the sequence of reflected photonic qubits and generate a first sequence of entangled photonic qubits; and a first optical circulator configured to direct the sequence of emitted photonic qubits from an input of the first passive component to the first delay line, wherein the first optical circulator is also configured to direct the first sequence of entangled photonic qubits to an output of the first passive component as the first resource state.

In some aspects, the techniques described herein relate to an apparatus, further including a second passive component configured to generate a second resource state, the second passive component including: a second delay line configured to generate a second sequence of reflected photonic qubits by reflecting each photon of the first sequence of entangled photonic qubits after a second predetermined time delay; a second Controlled-Z (CZ) gate configured to entangle the first sequence of entangled photonic qubits with the second sequence of reflected photonic qubits and generate a second sequence of entangled photonic qubits; and a second optical circulator configured to direct the first sequence of entangled photonic qubits from an input of the second passive component to the second delay line, wherein the second optical circulator is also configured to direct the second sequence of entangled photonic qubits to an output of the second passive component as the second resource state.

In some aspects, the techniques described herein relate to an apparatus, further including a plurality of additional passive components configured to generate a multi-dimensional resource state, wherein each additional passive component includes a respective optical circulator, a respective delay line with a respective predetermined time delay, and a respective CZ gate.

In some aspects, the techniques described herein relate to an apparatus, wherein a dimensionality of the multi-dimensional resource state is determined by a total number of passive components in the plurality of additional passive components and the respective predetermined time delay of each additional passive component.

In some aspects, the techniques described herein relate to an apparatus, wherein the emitter is a quantum dot that is configured to be excited with a predetermined timing pattern to generate the sequence of emitted photonic qubits.

In some aspects, the techniques described herein relate to an apparatus, wherein the predetermined timing pattern determines a form of the first resource state.

In some aspects, the techniques described herein relate to an apparatus, wherein each photonic qubit in the first resource state is time-bin encoded such that a state of each photonic qubit is measured by a time of arrival of the single photon within a time frame of each photonic qubit.

In some aspects, the techniques described herein relate to an apparatus, wherein the first CZ gate is an array of quantum dots that is configured to entangle the sequence of emitted photonic qubits with the sequence of reflected photonic qubits at the first CZ gate by generating a $\pi$-phase shift in each emitted photonic qubit and in each reflected photonic qubit that passes through the array of quantum dots unless the single photons of a particular emitted photonic qubit and a particular reflected photonic qubits overlap when passing through the array of quantum dots.

In some aspects, the techniques described herein relate to a system including: a quantum emitter configured to produce a single photon encoding an emitted photonic qubit based on a state of the quantum emitter; a resonant pulse generator configured to excite the quantum emitter into producing a sequence of emitted photonic qubits; and a series of one or more passive components configured to generate a resource state from the sequence of emitted photonic qubits, each respective passive component of the one or more passive components including: a respective delay line configured to generate a sequence of reflected photonic qubits by reflecting each photon of a respective input sequence of photonic qubits after a respective predetermined time delay; a respective Controlled-Z (CZ) gate configured to entangle the respective input sequence of photonic qubits with the sequence of reflected photonic qubits and generate a respective sequence of entangled photonic qubits; and a respective optical circulator configured to direct the respective input sequence of photonic qubits to the respective delay line, wherein the respective optical circulator is also configured to direct the respective sequence of entangled photonic qubits to an output of the respective passive component, wherein the sequence of emitted photonic qubits is an input sequence of photonic qubits for an initial passive component of the one or more passive components, and wherein the resource state is an output sequence of photonic qubits for a final passive component of the one or more passive components.

In some aspects, the techniques described herein relate to a system, wherein a dimensionality of the resource state is determined by a total number of the one or more passive components and the respective predetermined time delay of each respective passive component.

In some aspects, the techniques described herein relate to a system, wherein a predetermined pattern of resonant pulses produced by the resonant pulse generator determines a form of the resource state.

In some aspects, the techniques described herein relate to a system, wherein each photonic qubit in the resource state is time-bin encoded such that each photonic qubit is measured by a time of arrival of the single photon within a time frame of each photonic qubit.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   producing a sequence of emitted photonic qubits via an emitter, wherein each emitted photonic qubit in the sequence of emitted photonic qubits is encoded with a single photon;
   directing the sequence of emitted photonic qubits to a first optical circulator of a first passive component, the first passive component comprising the first optical circulator, a first delay line, and a first Controlled-Z (CZ) gate;
   reflecting the sequence of emitted photonic qubits at an end of the first delay line to generate a sequence of reflected photonic qubits, wherein the first delay line reflects each photon in the sequence of emitted photonic qubits as a photon in the sequence of reflected photonic qubits after a first predetermined time delay;
   entangling the sequence of emitted photonic qubits with the sequence of reflected photonic qubits at the first CZ gate;
   directing a first resource state with the first optical circulator to an output of the first passive component, the first resource state comprising entangled qubits configured for performing a corresponding quantum computing operation, the first resource state generated from the sequence of reflected photonic qubits that is entangled with the sequence of emitted photonic qubits; and
   emitting the first resource state as a first sequence of entangled photonic qubits.

2. An apparatus comprising:
   an emitter configured to produce a sequence of emitted photonic qubits, wherein each photonic qubit in the sequence of emitted photonic qubits is encoded with a single photon; and
   a first passive component configured to generate a first resource state, the first resource state comprising entangled qubits configured for performing a corresponding quantum computing operation, the first passive component comprising:
      a first delay line configured to generate a sequence of reflected photonic qubits by reflecting each photon of the sequence of emitted photonic qubits after a first predetermined time delay;
      a first Controlled-Z (CZ) gate configured to entangle the sequence of emitted photonic qubits with the sequence of reflected photonic qubits and generate a first sequence of entangled photonic qubits; and
      a first optical circulator configured to direct the sequence of emitted photonic qubits from an input of the first passive component to the first delay line, wherein the first optical circulator is also configured to direct the first sequence of entangled photonic qubits to an output of the first passive component as the first resource state.

3. A system comprising:
   a quantum emitter configured to produce a single photon encoding an emitted photonic qubit based on a state of the quantum emitter;
   a resonant pulse generator configured to excite the quantum emitter into producing a sequence of emitted photonic qubits; and
   a series of one or more passive components configured to generate a resource state from the sequence of emitted photonic qubits, the resource state comprising entangled qubits configured for performing a corresponding quantum computing operation, each respective passive component of the one or more passive components comprising:
      a respective delay line configured to generate a sequence of reflected photonic qubits by reflecting each photon of a respective input sequence of photonic qubits after a respective predetermined time delay;
      a respective Controlled-Z (CZ) gate configured to entangle the respective input sequence of photonic qubits with the sequence of reflected photonic qubits and generate a respective sequence of entangled photonic qubits; and
      a respective optical circulator configured to direct the respective input sequence of photonic qubits to the respective delay line, wherein the respective optical circulator is also configured to direct the respective sequence of entangled photonic qubits to an output of the respective passive component, wherein the sequence of emitted photonic qubits is an input sequence of photonic qubits for an initial passive component of the one or more passive components, and wherein the resource state is an output sequence of photonic qubits for a final passive component of the one or more passive components.

4. The method of claim 1, further comprising:

directing the first resource state to a second optical circulator of a second passive component, the second passive component comprising the second optical circulator, a second delay line, and a second CZ gate;

reflecting the first sequence of entangled photonic qubits of the first resource state at an end of the second delay line to generate a second sequence of reflected photonic qubits, wherein the second delay line reflects each photon in the first resource state as a photon in the second sequence of reflected photonic qubits after a second predetermined time delay;

entangling the first sequence of entangled photonic qubits with the second sequence of reflected photonic qubits at the second CZ gate;

directing a second resource state with the second optical circulator to an output of the second passive component, the second resource state generated from the second sequence of reflected photonic qubits that is entangled with the first resource state; and emitting the second resource state as a second sequence of entangled photonic qubits.

5. The method of claim 1, further comprising generating a multi-dimensional resource state by directing the first resource state to a plurality of additional passive components, wherein each additional passive component of the plurality of additional passive components includes a respective optical circulator, a respective delay line with a respective predetermined time delay, and a respective CZ gate.

6. The method of claim 1, wherein producing the sequence of emitted photonic qubits comprises exciting a quantum dot with a predetermined timing pattern to generate the sequence of emitted photonic qubits.

7. The method of claim 1, wherein each photonic qubit in the first resource state is time-bin encoded such that a state of each photonic qubit is measured by a time of arrival of the single photon within a time frame of each photonic qubit.

8. The method of claim 1, wherein entangling the sequence of emitted photonic qubits with the sequence of reflected photonic qubits at the first CZ gate comprises directing the sequence of emitted photonic qubits and the sequence of reflected photonic qubits at an array of quantum dots acting as the first CZ gate by generating a x-phase shift in each emitted photonic qubit and in each reflected photonic qubit that passes through the array of quantum dots unless the single photons of a particular emitted photonic qubit and a particular reflected photonic qubits overlap when passing through the array of quantum dots.

9. The apparatus of claim 2, further comprising a second passive component configured to generate a second resource state, the second passive component comprising:

a second delay line configured to generate a second sequence of reflected photonic qubits by reflecting each photon of the first sequence of entangled photonic qubits after a second predetermined time delay;

a second Controlled-Z (CZ) gate configured to entangle the first sequence of entangled photonic qubits with the second sequence of reflected photonic qubits and generate a second sequence of entangled photonic qubits; and a second optical circulator configured to direct the first sequence of entangled photonic qubits from an input of the second passive component to the second delay line, wherein the second optical circulator is also configured to direct the second sequence of entangled photonic qubits to an output of the second passive component as the second resource state.

10. The apparatus of claim 2, further comprising a plurality of additional passive components configured to generate a multi-dimensional resource state, wherein each additional passive component includes a respective optical circulator, a respective delay line with a respective predetermined time delay, and a respective CZ gate.

11. The apparatus of claim 2, wherein the emitter is a quantum dot that is configured to be excited with a predetermined timing pattern to generate the sequence of emitted photonic qubits.

12. The apparatus of claim 2, wherein each photonic qubit in the first resource state is time-bin encoded such that a state of each photonic qubit is measured by a time of arrival of the single photon within a time frame of each photonic qubit.

13. The apparatus of claim 2, wherein the first CZ gate is an array of quantum dots that is configured to entangle the sequence of emitted photonic qubits with the sequence of reflected photonic qubits at the first CZ gate by generating a x-phase shift in each emitted photonic qubit and in each reflected photonic qubit that passes through the array of quantum dots unless the single photons of a particular emitted photonic qubit and a particular reflected photonic qubits overlap when passing through the array of quantum dots.

14. The system of claim 3, wherein a dimensionality of the resource state is determined by a total number of the one or more passive components and the respective predetermined time delay of each respective passive component.

15. The system of claim 3, wherein a predetermined pattern of resonant pulses produced by the resonant pulse generator determines a form of the resource state.

16. The system of claim 3, wherein each photonic qubit in the resource state is time-bin encoded such that each photonic qubit is measured by a time of arrival of the single photon within a time frame of each photonic qubit.

17. The method of claim 5, wherein a dimensionality of the multi-dimensional resource state is determined by a total number of passive components in the plurality of additional passive components and the respective predetermined time delay of each additional passive component.

18. The method of claim 6, wherein the predetermined timing pattern determines a form of the first resource state.

19. The apparatus of claim 10, wherein a dimensionality of the multi-dimensional resource state is determined by a total number of passive components in the plurality of additional passive components and the respective predetermined time delay of each additional passive component.

20. The apparatus of claim 11, wherein the predetermined timing pattern determines a form of the first resource state.

* * * * *

UNITED STATES PATENT AND TRADEMARK OFFICE
CERTIFICATE OF CORRECTION

PATENT NO. : 12,175,331 B2
APPLICATION NO. : 17/993092
DATED : December 24, 2024
INVENTOR(S) : Alireza Shabani et al.

It is certified that error appears in the above-identified patent and that said Letters Patent is hereby corrected as shown below:

In the Claims

Claim 8, Column 15, Line 54, please replace "a x-phase shift" with --a $\pi$-phase shift--

Claim 13, Column 16, Line 33, please replace "a x-phase shift" with --a $\pi$-phase shift--

Signed and Sealed this
Fourth Day of February, 2025

Coke Morgan Stewart
*Acting Director of the United States Patent and Trademark Office*